(12) United States Patent
Locke et al.

(10) Patent No.: US 7,318,068 B2
(45) Date of Patent: Jan. 8, 2008

(54) SYNCHRONIZATION OF APPLICATION DOCUMENTATION ACROSS DATABASE INSTANCES

(75) Inventors: Victoria Al. Locke, Fishkill, NY (US); James A. Martin, Jr., Endicott, NY (US); Diane C. Rauch, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 10/898,109

(22) Filed: Jul. 22, 2004

(65) Prior Publication Data

US 2006/0020643 A1    Jan. 26, 2006

(51) Int. Cl.
G06F 17/00    (2006.01)

(52) U.S. Cl. .................. 707/102; 707/101; 707/103 R; 707/103 X

(58) Field of Classification Search ..................... None
See application file for complete search history.

(56) References Cited

U.S. PATENT DOCUMENTS

| | | | |
|---|---|---|---|
| 5,295,222 A * | 3/1994 | Wadhwa et al. | ............ 717/104 |
| 6,016,393 A * | 1/2000 | White et al. | ................ 719/315 |
| 6,556,985 B1 | 4/2003 | Karch | |
| 6,601,076 B1 | 7/2003 | McCaw et al. | |
| 6,684,188 B1 * | 1/2004 | Mitchell et al. | ............... 705/3 |
| 2002/0055939 A1 | 5/2002 | Nardone et al. | |
| 2002/0133509 A1 | 9/2002 | Johnston et al. | |
| 2003/0018778 A1 | 1/2003 | Martin et al. | |
| 2003/0153991 A1 | 8/2003 | Visser et al. | |
| 2003/0167286 A1 | 9/2003 | Yasuta | |
| 2003/0217096 A1 | 11/2003 | McKelvie et al. | |
| 2004/0006506 A1 | 1/2004 | Hoang | |
| 2004/0040025 A1 | 2/2004 | Lehtinen | |

* cited by examiner

*Primary Examiner*—Sana Al-Hashemi
(74) *Attorney, Agent, or Firm*—Schmeiser, Olsen & Watts; John R. Pivnichny

(57) ABSTRACT

A method and system for synchronizing M application documentations across N database instances. Each database instance has a same structural design. N and M are each at least 2. A documentation synchronization agent is executed which updates N1 database instances with the M application documentations and does not update a remaining N-N1 database instances with the M application documentations if N1 is equal to N. N1 is at least 1. If N1 is less than N, then each of the remaining N-N1 database instances include a first and/or second characteristic. The first characteristic is that the remaining database instances include the M application documentations upon initiation of the executing. The second characteristic is that the agent is unable to access the remaining database instance during the executing.

30 Claims, 7 Drawing Sheets

|  | TOOLBARS | 25 |  |
|---|---|---|---|
| 10.0 HELP TOPICS  21 | | PROCEDURAL HELP | 22 |
| 11.0 ADMINISTRATION<br>    11.01 FIELD LEVEL HELP<br>    11.02 FORM LEVEL HELP<br>    11.03 VIEW LEVEL HELP<br>    11.04 ACTION HELP<br>    11.05 PROCEDURAL HELP<br>    11.06 IMAGE RESOURCES<br><br>12.0 MACRO COMMANDS<br><br>13.0 TROUBLESHOOTING | | INSTALLATION PROCEDURE<br>INPUT PROCEDURE<br>SAVE RESULTS PROCEDURE<br>EDIT PROCEDURES | |
|  | STATUS BARS | 26 |  |

SAVE RESULTS PROCEDURE

TO SAVE RESULTS: HIGHLIGHT THE TEXT OR GRAPHICAL IMAGE TO BE SAVED AND RIGHT-CLICK YOUR MOUSE TO BRING UP A MENU. FROM THE MENU, SELECT "SAVE RESULTS". NEXT, YOU WILL BE PROMPTED FOR INDENTIFICATION OF A FILE INTO WHICH THE RESULTS ARE TO BE SAVED. YOU MAY IDENTIFY THIS FILE BY TYPING THE FILE PATH IN THE INDICATED SPACE OR BY NAVIGATING THROUGH A FILE DIRECTORY TREE TO FIND THIS FILE AND LEFT DOUBLE-CLICK ON THIS FILE.

FIG. 2B

TOOLBARS  25

10.0 HELP TOPICS *121*

11.0 ADMINISTRATION
    11.01 FIELD LEVEL HELP
    11.02 FORM LEVEL HELP
    11.03 VIEW LEVEL HELP
    11.04 ACTION HELP
    11.05 PROCEDURAL HELP
    11.06 IMAGE RESOURCES
        11.051 INSTALLATION PROCEDURE
        11.052 INPUT PROCEDURE
        11.053 SAVE RESULTS PROCEDURE
        11.054 EDIT PROCEDURES
    11.06 IMAGE RESOURCES

12.0 MACRO COMMANDS

13.0 TROUBLESHOOTING

*122*

SAVE RESULTS PROCEDURE

TO SAVE RESULTS: HIGHLIGHT THE TEXT OR GRAPHICAL IMAGE TO BE SAVED AND RIGHT-CLICK YOUR MOUSE TO BRING UP A MENU. FROM THE MENU, SELECT "SAVE RESULTS". NEXT, YOU WILL BE PROMPTED FOR IDENTIFICATION OF A FILE INTO WHICH THE RESULTS ARE TO BE SAVED. YOU MAY IDENTIFY THIS FILE BY TYPING THE FILE PATH IN THE INDICATED SPACE OR BY NAVIGATING THROUGH A FILE DIRECTORY TREE TO FIND THIS FILE AND LEFT DOUBLE-CLICK ON THIS FILE.

STATUS BARS  *126*

FIG. 3

SYNCHRONIZATION OF APPLICATION DOCUMENTATION ACROSS DATABASE INSTANCES

BACKGROUND OF THE INVENTION

1. Technical Field

The present invention relates to a method and system for synchronizing application documentations across database instances.

2. Related Art

The updating of application documentation in database instances is inefficient in the related art. Accordingly, there is a need for a more efficient method and system for updating application documentation in database instances than currently exists in the related art.

SUMMARY OF THE INVENTION

The present invention provides a method for synchronizing M application documentations across N database instances, said method comprising:

providing the N database instances, wherein N is at least 2, and wherein each database instance of the N database instances comprise a same structural design;

providing the M application documentations, wherein M is at least 2; and executing a documentation synchronization agent, wherein said executing comprises updating N1 database instances of the N database instances with the M application documentations and not updating the remaining N-N1 database instances that remains if N1 is less than N, wherein N1 is at least 1, wherein if N1 is less than N then each of the remaining N-N1 database instances comprise at least one characteristic of a first characteristic and a second characteristic, wherein the first characteristic is that the remaining database instances comprise the M application documentations upon initiation of said executing, and wherein the second characteristic is that the documentation synchronization agent is unable to access the remaining N-N1 database instances during said executing.

The present invention provides a computer system comprising a processor and a computer readable memory unit coupled to the processor, said memory unit comprising computer readable program code that when executed by the processor implements a method for synchronizing M application documentations across N database instances, N being at least 2, M being at least 2, said method comprising executing a documentation synchronization agent, wherein said executing comprises updating N1 database instances of the N database instances with the M application documentations and not updating the remaining N-N1 database instances that remains if N1 is less than N, wherein N1 is at least 1, wherein if N1 is less than N then each of the remaining N-N1 database instances comprise at least one characteristic of a first characteristic and a second characteristic, wherein the first characteristic is that the remaining database instances comprise the M application documentations upon initiation of said executing, and wherein the second characteristic is that the documentation synchronization agent is unable to access the remaining N-N1 database instances during said executing.

The present invention provides a computer program product, comprising a computer usable medium having a computer readable program code embodied therein, said computer readable program code adapted to implement a method for synchronizing M application documentations across N database instances, N being at least 2, M being at least 2, said method comprising executing a documentation synchronization agent, wherein said executing comprises updating N1 database instances of the N database instances with the M application documentations and not updating the remaining N-N1 database instances that remains if N1 is less than N, wherein N1 is at least 1, wherein if N1 is less than N then each of the remaining N-N1 database instances comprise at least one characteristic of a first characteristic and a second characteristic, wherein the first characteristic is that the remaining database instances comprise the M application documentations upon initiation of said executing, and wherein the second characteristic is that the agent is unable to access the remaining N-N1 database instances during said executing.

The present invention advantageously provides a more efficient method and system for updating application documentation in database instances than currently exists in the related art.

BRIEF DESCRIPTION OF THE DRAWINGS

FIG. 2A depicts a documentations hierarchy and view, in accordance with embodiments of the present invention.

FIG. 2B depicts an application documentation, in accordance with embodiments of the present invention.

FIG. 3 depicts an alternative embodiment of the present invention in which the documentations hierarchy and view of FIG. 2A and the application documentation of FIG. 2B are combined.

DETAILED DESCRIPTION OF THE INVENTION

Figure 1:
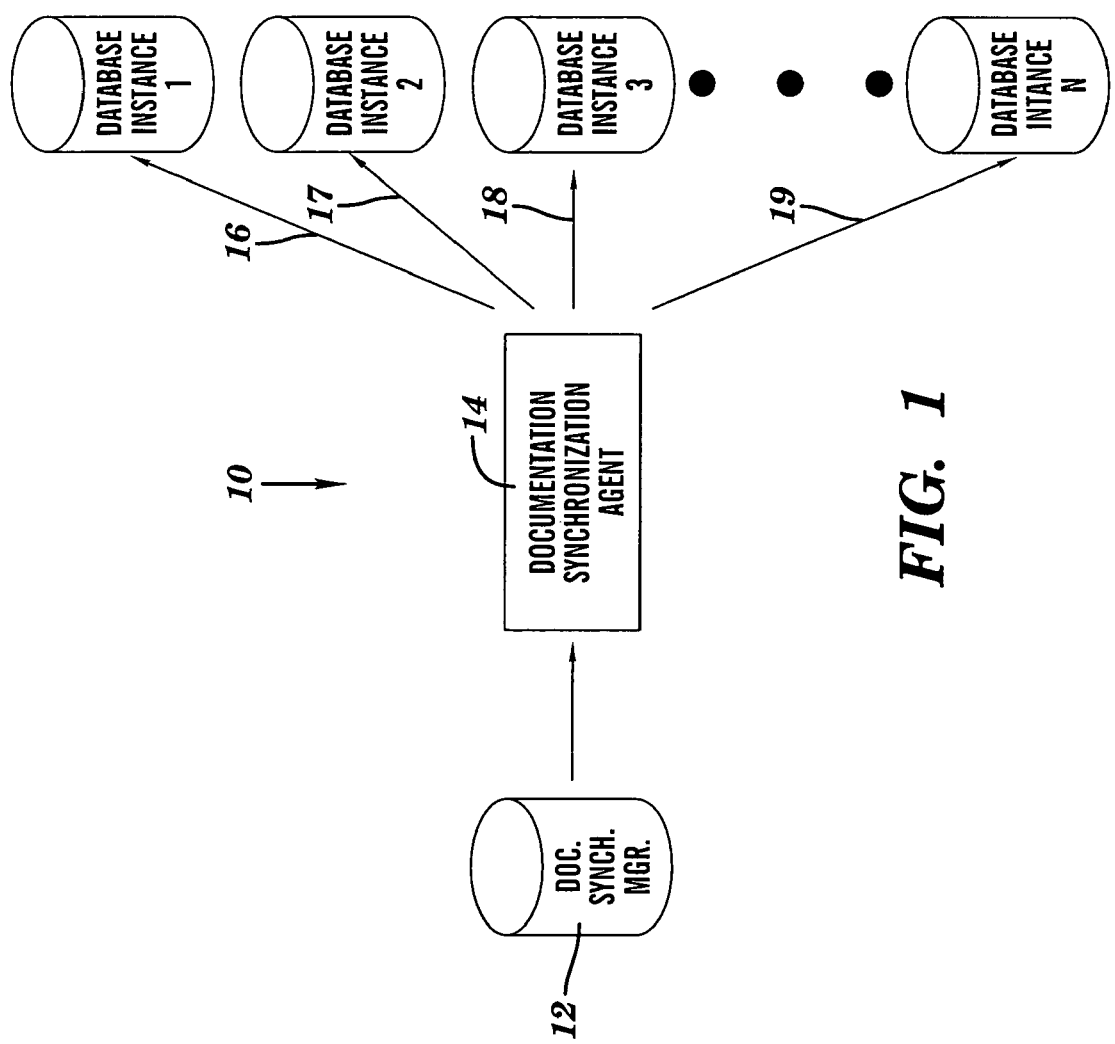
FIG. 1 depicts a system for managing an updating of database instances with application documentations, in accordance with embodiments of the present invention.

FIG. 1 depicts a system 10 with for managing an updating of N database instances with application documentations, in accordance with embodiments of the present invention. The system 10 includes a documentation synchronization manager 12, a documentation synchronization agent 14, and the N database instances. N is at least 2. The N database instances comprise database instance 1, database instance 2, database instance 3, . . . , database instance N. See FIG. 7, described infra, for a computer system that includes the system 10 of FIG. 1.

In FIG. 1, the documentation synchronization manager 12 is a data structure that includes a database for storing or accessing "application documentation" which are intended to each be placed and stored in each database instance of the N database instances. A "documentation" in relation to a "subject" is defined as a document that comprises that documents (i.e. describes) an aspect of the subject. An "application documentation" is defined as a documentation in relation to software application (i.e. computer coder or program). Thus, the "subject" of an application documentation is a software application (i.e. computer code or program). "Documentation" is defined as the plural form of "documentation". Thus, M application documentation consist of application documentations A(1), A(2), ..., A(M). An application documentation may relate to the software application in any manner. For example, the application documentation may pertain to hardware and/or software supporting execution of the application. Application documentation will be illustrated infra in conjunction with FIGS. 2A, 2B and 3. The application documentation may be comprised by the data structure of the documentation synchronization manager 12. if existing outside of the documentation synchronization manager 12, the application documentation may reside in a single location (e.g. within s single database) or alternatively may be distributed within a plurality of locations (e.g. within a plurality of databases). The documentation synchronization agent 14 may be comprised by the data structure of the documentation synchronization manager 12, or may alternatively exist outside of the documentation synchronization manager 12.

A database is defined as a repository in which data is stored in a structured format. Thus, a database includes data storage structures such as, inter alia, tables, files, etc. Each data storage structure has a characteristic structure in a structured format. For example, a table is organized into columns and rows. A column is also called a "field". The structured format of a table defines the fields, including the definition of each field, the data type of each field (e.g., integer, floating point, character, binary, etc.), and the maximum length or fixed length of each field (e.g., number of characters or bits, highest and lowest permitted integer values, etc.). As another example, a file may be organized into records. The structured format of a file defines the fields within the record, wherein the records may be fixed-length records or variable-length records.

The N database instances have a same structural design. The structural design that is the same for the N database instances is characterized by a defined set of data storage structures within each database instance. For example, the structural design may comprise a defined set of tables which includes a specification of the structured format of each table. Although the N database instances have a same structural design, the N database instances may comprise different data values within the framework of the same structural design.

As a first example of multiple database instances, the N database instances may each represent an organization and its members and/or employees in different geographic locations. For this first example, the database instance 1 may be a "Boston" database instance, the database instance 2 may be a "Chicago" database instance, the database instance 13 may be a "Denver" database instance, etc.

As a second example of multiple database instances, the N database instances may each represent a functional component of an organization. For this second example, the database instance 1 may be a "engineering design" database instance, the database instance 2 may be an "administration" database instance, the database instance 3 may be a "sales" database instance, etc.

As a third example of multiple database instances, the N database instances may each represent a project of an organization such as a medical research organization. For this third example for the case of a medical research organization, the database instance 1 may be an "coronary implant" database instance, the database instance 2 may be a "tumor growth tracker" database instance, the database instance may be a "blood lipid analyzer" database instance, etc.

The documentation synchronization agent 14 is an "agent" adapted to update the N database instances which are stored in the documentation synchronization manager 12. An "agent" is defined as a computer executable program or software that functions as a background process within the operating system environment. The agent can function concurrent with, and independent of, other software execution that is occurring within the operating system environment. Although the description herein describes the documentation synchronization agent 14 as a single agent, all of the functionality described herein for the documentation synchronization agent 14 may alternatively be performed, in general, by two or more of such documentation synchronization agents working cooperatively with one another. The documentation synchronization agent 14 communicates with database instances 1, 2, 3, ..., N over communication links 16, 17, 18, ..., 19, respectively.

FIG. 2A depicts a view 22 of documentation identifiers associated with a documentations hierarchy 21, in accordance with embodiments of the present invention. A "view" is a "virtual data structure" in which the data structure is represented in a visual form (such as the list of items visually appearing in the view 22), but is physically stored in a database. FIG. 2A also comprises toolbars 25 and status bars 26. The toolbars 25 display selectable options under such categories as such as "File", "Edit", Tools", etc. The status bars 26 display status information such as the location of a cursor appearing in FIG. 2A.

The documentations hierarchy 21 in FIG. 2A is a two-level hierarchy. The first level of the two-level documentations hierarchy 21 has classification of: 10.0 Help Topics, 11.0 Administration, and 12.0 Configuration. The second level of the 11.0 Administration has classifications of: 11.01 Field level help, 11.02 Form level help, 11.03 View level help, 11.04 Action help, 11.05 Procedural help, and 11.06 Image resources. The lowest level classifications of the documentations hierarchy (e.g., the classifications 11.01-11.06 in FIG. 2A) are called "documentations categories." Although the documentations hierarchy 21 in FIG. 2 is a two-level hierarchy, the documentations hierarchy of the present invention generally comprises one or more levels.

As seen in FIG. 2A, the highlighting of "11.05 Procedural Help" in the documentations hierarchy 21 triggers a view 22 of a display of the set of application documentation identifiers associated with the documentations category of 11.05 Procedural help. These application documentation identifiers identify various types of procedures for which a help documentation may be displayed, namely: installation procedure, input procedure, save results procedure, edit procedure, etc.

FIG. 2B depicts an application documentation associated with the "save results procedure" in the view 22 of FIG. 2A, in accordance with embodiments of the present invention. Thus, the highlighting of "Save Results Procedure" in the view 22 triggers a display of the application documentation associated with the "save results procedure" as shown in FIG. 2B.

FIG. 3 depicts an alternative embodiment of the present invention in which the two-level documentations hierarchy 21 and the view 22 of FIG. 2A are combined to form a three-level documentations hierarchy 121 in FIG. 3. The documentations categories in the view 22 of FIG. 2A constitute the lowest level classification of the documentations hierarchy 121 in FIG. 3. The view 122 in FIG. 3 includes the application documentation of FIG. 2B. Thus in FIG. 3, the highlighting of "11.053 Save Results Procedure" in the documentations hierarchy 121 triggers a display of the application documentation associated with the "save results procedure" in the view 122. FIG. 3 also comprises toolbars 125 and status bars 126 which are respectively analogous to toolbars 25 and status bars 26 of FIG. 2A.

Figure 4:
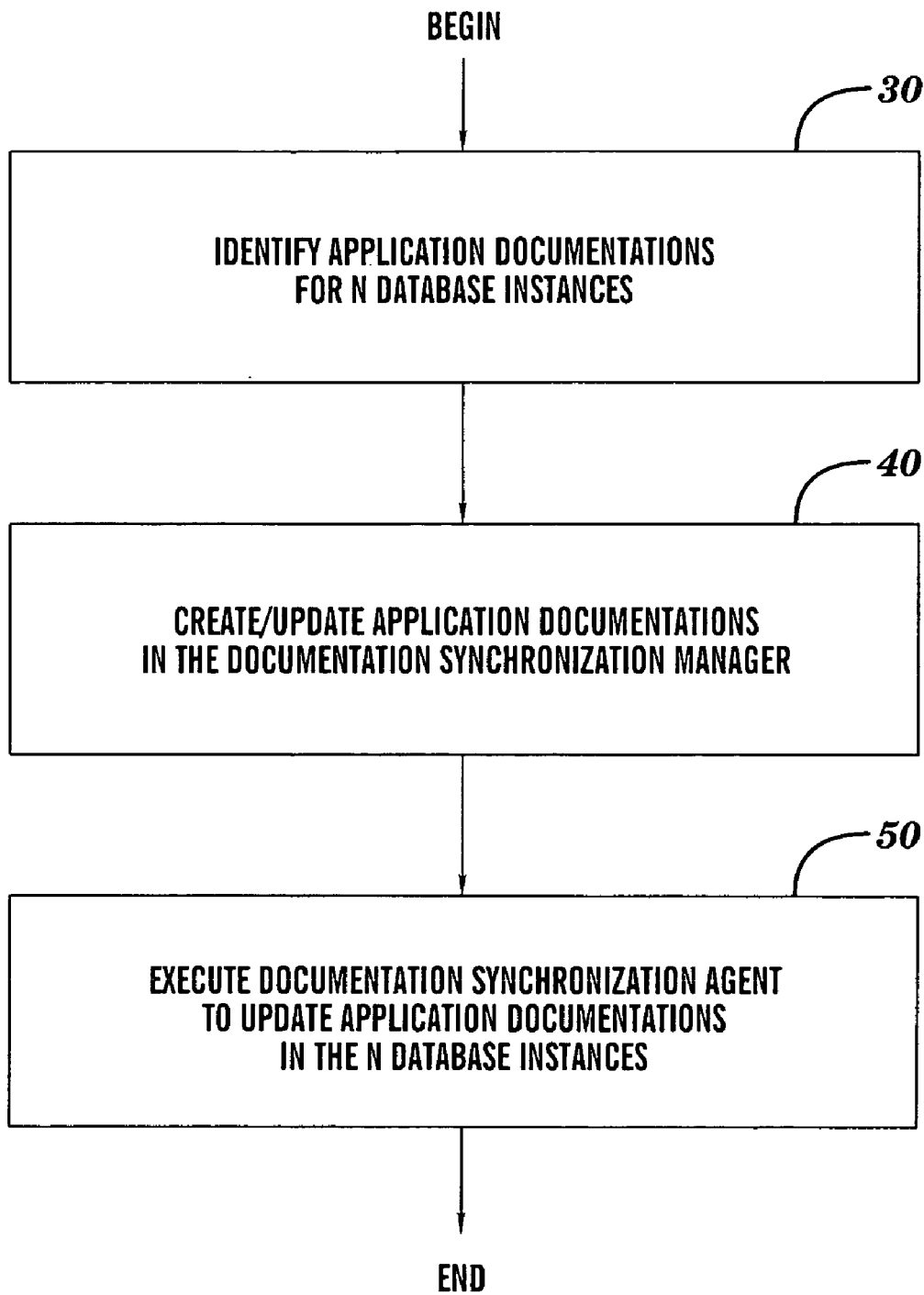
FIG. 4 is a high-level flow chart depicting creating/editing of application documentations and updating of the application documentations across the database instances of FIG. 1, in accordance with embodiments of the present invention.

FIG. 4 is a high-level flow chart depicting steps 30, 40, and 50 for the creation/editing of application documentations and updating of the application documentations across the N database instances of FIG. 1, in accordance with embodiments of the present invention.

In step 30, application documentations intended to be stored in the N database instances of FIG. 1 are identified. The application documentations identified in step 30 may be initial application documentations to be stored in the N database instances, new application documentations to be added to application documentations already in existence, or modifications of application documentations already in existence.

In step 40 which is executed after step 30, the application documentations identified in step 30 are encoded into the documentation synchronization manager 12 of FIG. 1, by creation for newly identified documentations or by updating for modified versions of application documentations already in existence. Step 40 is described in greater detail in the flow chart of FIG. 4, discussed infra.

In step 50 which is executed after step 40, the documentation synchronization agent 14 of FIG. 1 updates the N database instances in accordance with the application documentations in the documentation synchronization manager 12 of FIG. 1. Step 50 is described in greater detail in the flow chart of FIG. 6, discussed infra.

Figure 5:
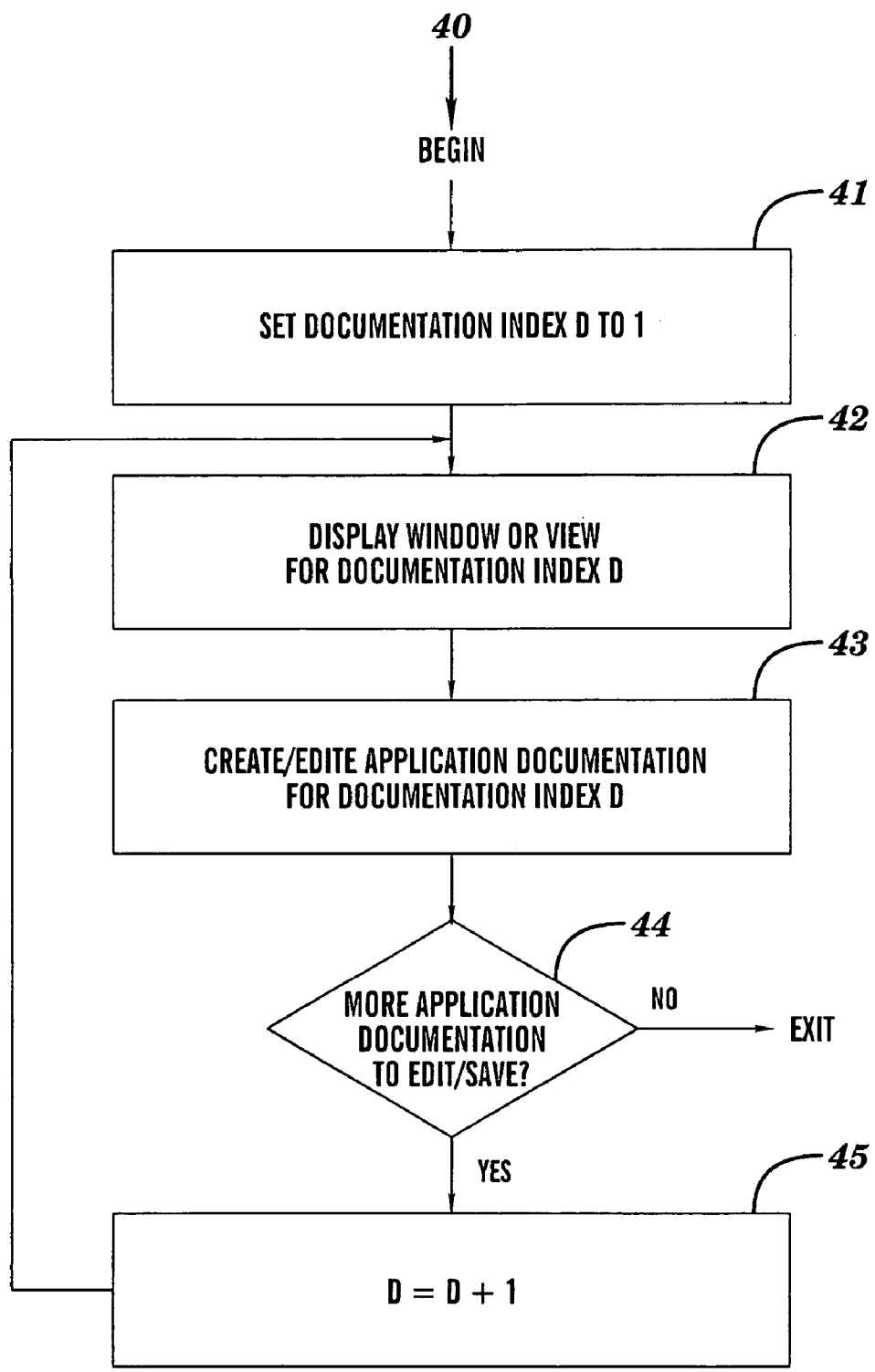
FIG. 5 is a flow chart depicting in greater detail the creation/editing of the application documentations of FIG. 4, in accordance with embodiments of the present invention.

FIG. 5 is a flow chart depicting steps 41-45 which show step 40 of FIG. 3 in greater detail for the creation/editing of the application documentations, in accordance with embodiments of the present invention.

Step 41 sets a documentation index D to 1, so as to initialize processing the first documentation to be processed. In the embodiment of FIGS. 2A and 2B, the documentation index D indexes the documentation identifiers (e.g., Installation Procedure, Input Procedure, etc.) in view 22. In the embodiment of FIG. 3, the documentation index D indexes the lowest level classifications (e.g., 11.051 Installation Procedure, 11.052 Input Procedure, etc.) of the documentations hierarchy 121.

Step 42 displays a window or view for a documentation associated with documentation index D. If the documentation for document index D is a new documentation to be created and subsequently saved, then step 42 may display a blank window into which the new documentation may be entered. If the documentation for document index D is an existing documentation to be edited and subsequently saved, then in the embodiment of FIGS. 2A and 2B step 42 displays a window or view of the documentation shown in FIG. 2B. If the documentation for document index D is an existing documentation to be edited and subsequently saved, then in the embodiment of FIG. 3, step 42 displays a window or view of the documentation shown the view 122 in FIG. 3.

Step 43 is a create/edit step which may be performed either manually by an operator or in an automated fashion by software. Step 43 enters and subsequently saves the documentation in the window displayed of step 42 if the documentation is a new documentation. Step 43 edits and subsequently saves the documentation displayed in the window of step 42 if the documentation already exists and is being modified.

Step 44 determines whether there are any more documentations to edit/save. If there are no more documentations to edit/save, then the process of the flow chart of FIG. 5 is EXITed. If there are one or more documentations categories yet to edit/save, then the documentation index D is incremented by 1 in step 45 to step to the next documentations be edit/save, and steps 42-45 are iteratively repeated until all documentations categories have been processed.

Figure 6:
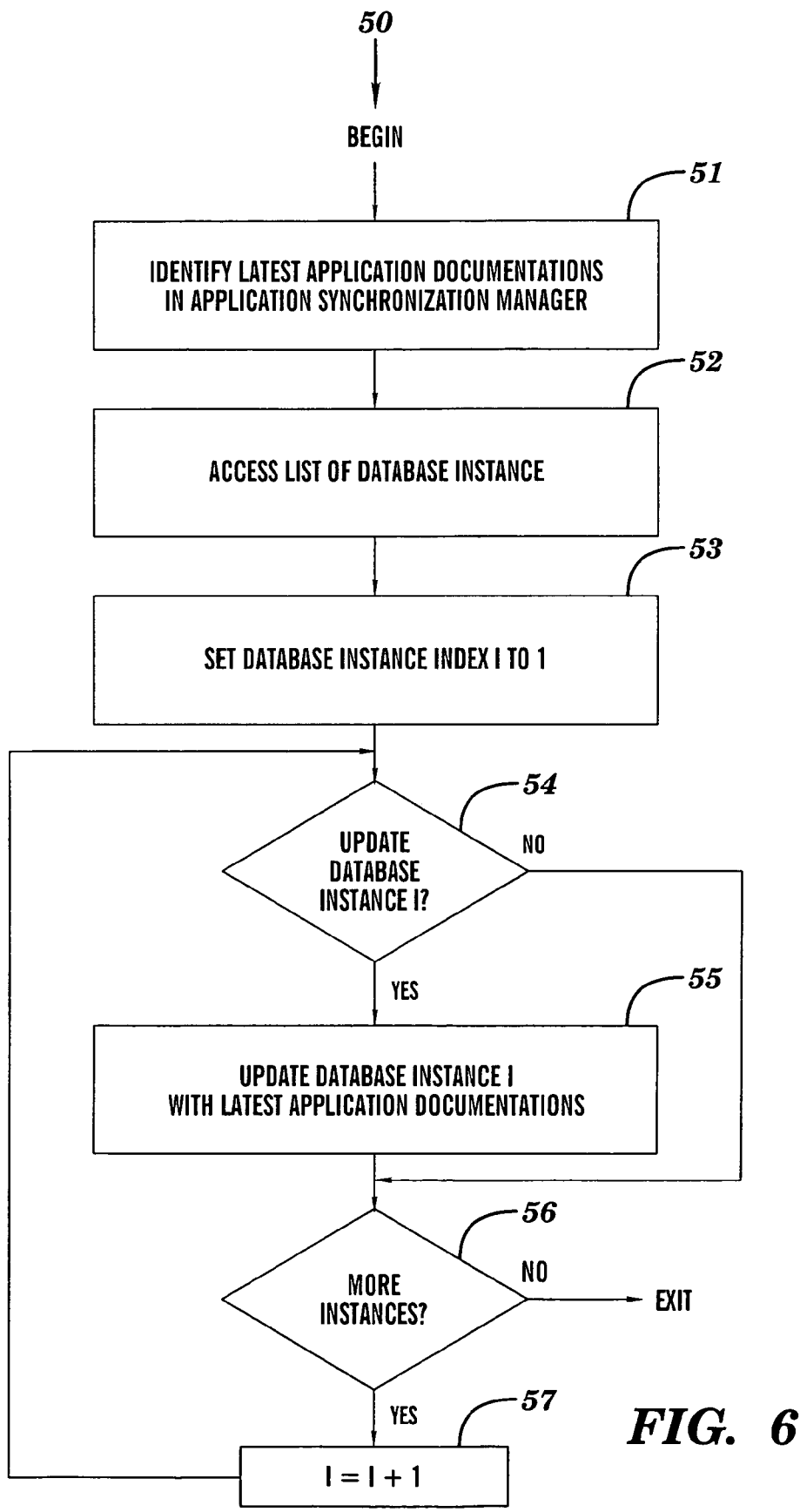
FIG. 6 is a flow chart depicting in greater detail the updating of the application documentations in the database instances of FIG. 4, in accordance with embodiments of the present invention.

FIG. 6 is a flow chart depicting steps 51-57 which show step 50 of FIG. 4 in greater detail for executing the documentation synchronization agent 14 of FIG. 1 to update application documentations across the N database instances of FIG. 1, in accordance with embodiments of the present invention.

Step 51 identifies the latest (i.e., most recent) application documentations in the documentations synchronization manager 12 of FIG. 1. Assume that there are M such application documentations, wherein M is at least 2.

Step 52 accesses a list of the N database instances.

Step 53 sets a database instance index I to 1, so as to initialize processing the first database instance of the N database instances to be potentially updated.

Step 54 determines whether to update database instance I with the M application documentations. In an embodiment, the documentation synchronization agent 14 of FIG. 1 always updates all database instance with the M application documentations if it is possible to do so. However, it may be impossible to update database instance I with the M application documentations. For example, the agent 14 may be unable to access the database instance I such as when the communication link to database instance I (e.g., one of the communication links 16-19 of FIG. 1) is disabled or when the database instance I is disabled. In another embodiment, database instance I will not be updated with the M application documentations if the agent 14 determines that the database instance I already comprises the M application documentations in the documentations synchronization manager 12 of FIG. 1. For example, at a recent previous time when less than N database instances existed (e.g., N-K database instances existed such that K is at least 1), a comprehensive updating of all existing database instances was successfully accomplished including the updating of database instance I. For times following the recent previous time in this example, the application documentations have not changed but K new database instances have been added, so that the current updating of the N database instances need update only the K new database instances with the M application documentations. Thus in this example, it would be determined in step 54 not to update the database instance I with the M application documentations if database instance I is one of the N-K database instances referred to supra.

If it is determined in step 54 to update database instance I with the M application documentations, then database instance I is updated in step 55 with the M application documentations identified in step 51, followed by execution of step 56. In an embodiment, step 55 may be implemented by deleting all existing application documentations in database instance I and adding the M application documentations identified in step 51 to database instance I. In another embodiment, step 56 may be implemented by keeping track of the status (i.e., version) of all existing application documentations in database instance I and adding/changing only those application documentations which do not already exist in the database instance I. If it is determined in step 54 not to update database instance I with the M application documentations, then step 56 is next executed.

Step 56 determines whether there are more database instances to process (i.e., whether I is less than N). If it is determined in step 56 that there are no more database instances to process, then the process of the flow chart of FIG. 6 is EXITed. If it is determined in step 56 that there are more database instances to process (i.e., I is less than N), then the database index I is incremented by 1 in step 57 to step to the next database instance to process, and steps 54-57 are iteratively repeated until all database instances have been processed.

Based on the preceding description of the flow chart of FIG. 6, the execution of the documentation synchronization agent 14 of FIG. 1 generally comprises updating N1 database instances of the N database instances with the M application documentations and not updating the remaining N-N1 database instance that remains if N1 is less than N. N1 is at least 1. If N1 is less than N then each of the remaining N-N1 database instances may comprise at least one characteristic of a first characteristic and a second characteristic. The first characteristic is that the remaining N-N1 database instances comprise the M application documentations upon initiation of the execution of the documentation synchronization agent 14 in step 51. The second characteristic is that the documentation synchronization agent 14 is unable to access the remaining N-N1 database instances while the agent 14 is being executed.

Figure 7:
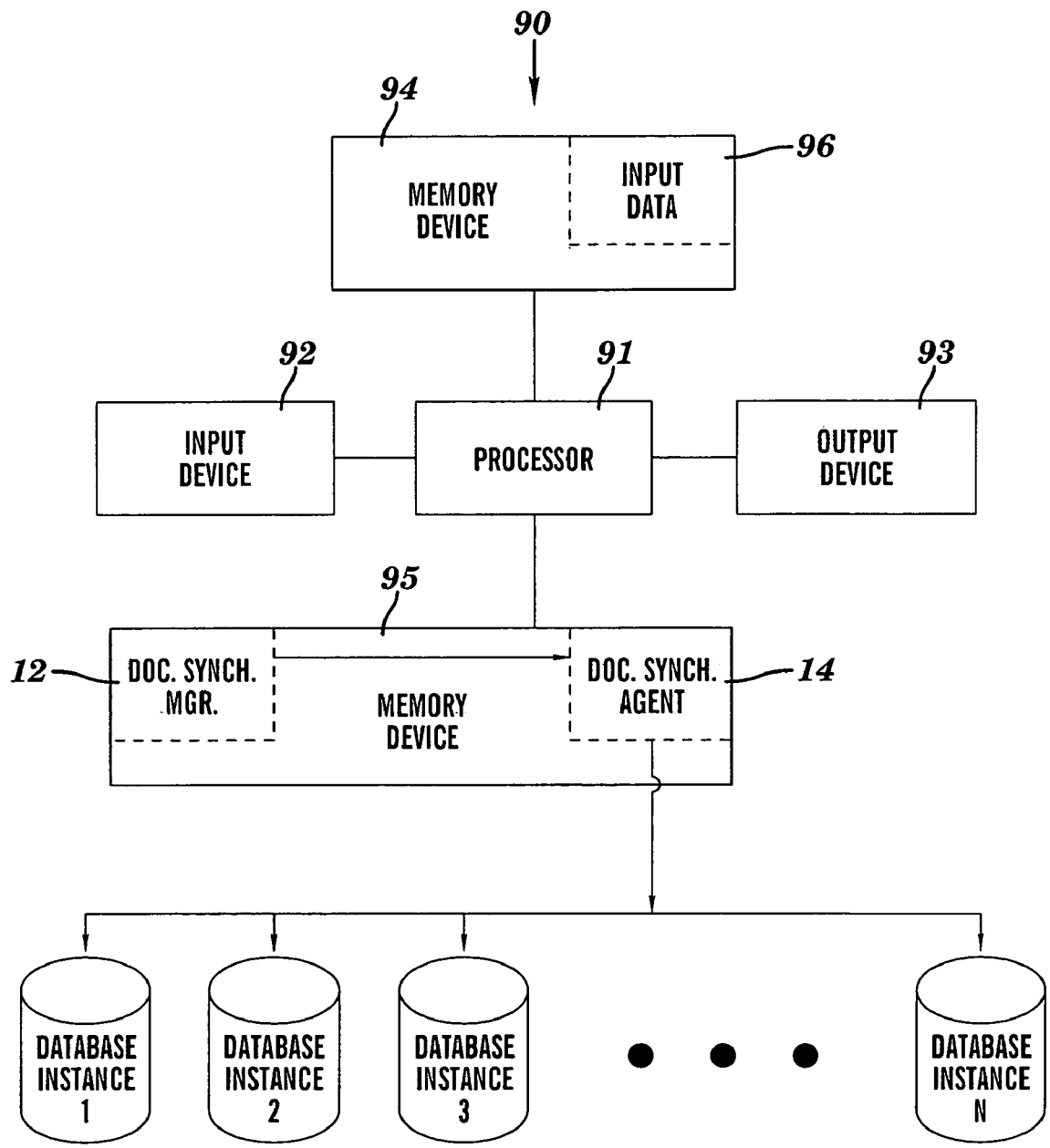
FIG. 7 depicts a computer system for managing and updating database instances having application documentations, in accordance with embodiments of the present invention.

FIG. 7 depicts a computer system for managing and updating database instances having application documentations, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 comprises a computer code which includes the documentation synchronization agent 14 of FIG. 1 for managing and updating database instances having application documentations. The memory device 95 further comprises the documentation synchronization manager 12 of FIG. 1. In some embodiments as stated supra, the documentation synchronization agent 14 may be comprised by the data structure of the documentation synchronization manager 12. The processor 91 executes the documentation synchronization agent 14. The memory device 94 includes input data 96. The input data 96 includes input required by the documentation synchronization agent 14. The output device 93 displays output from the documentation synchronization agent 14. Either or both memory devices 94 and 95 (or one or more additional memory devices not shown in FIG. 7) may be used as a computer usable medium (or a computer readable medium or a program storage device) having a computer readable program code embodied therein and/or having other data stored therein, wherein the computer readable program code comprises the computer code and the documentation synchronization agent 14 therein. Generally, a computer program product (or, alternatively, an article of manufacture) of the computer system 90 may comprise said computer usable medium (or said program storage device).

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for synchronizing M application documentations across N database instances, wherein each application documentation comprises a description of an aspect of a software application, said method comprising: providing the N database instances, wherein N is at least 2, and wherein each database instance of the N database instances comprise a same structural design, providing the M application documentations, wherein M is at least 2; and executing a documentation synchronization agent, wherein said executing comprises updating N1 database instances of the N database instances with the M application documentations and not updating the remaining N-N1 database instances that remains if N1 is less than N, wherein N1 is at least 1, wherein if N1 is less than N then each of the remaining N-N1 database instances comprise at least one characteristic of a first characteristic and a second characteristic; wherein the first characteristic is that the remaining database instances comprise the M application documentations upon initiation of said executing, and wherein the second characteristic is that the documentation synchronization agent is unable to access the remaining N-N1 database instances during said executing.

2. The method of claim 1, wherein N2 database instances of the N1 database instances comprises the M application documentations upon initiation of said executing, and wherein N2 is at least 1.

3. The method of claim 1, wherein N1 is equal to N.

4. The method of claim 1, wherein N1 is less than N.

5. The method of claim 4, wherein at least one database instance of the remaining N-N1 database instances comprises the first characteristic.

6. The method of claim 4, wherein at least one database instance of the remaining N-N1 database instances comprises the second characteristic.

7. The method of claim 4, wherein at least one database instance of the remaining N-N1 database instances comprises the first characteristic and the second characteristic.

8. The method of claim 1, wherein the M application documentations are distributed among a plurality of databases.

9. The method of claim 1, wherein the M application documentations are all contained within a documentation synchronizing manager such that the documentation synchronizing manager is a single data structure.

10. The method of claim 9, wherein the documentation synchronizing manager comprises the documentation synchronization agent.

11. A computer system comprising a processor and a computer readable memory unit coupled to the processor, said memory unit comprising computer readable program code that when executed by the processor implements a method for synchronizing M application documentations across N database instances, wherein each application documentation comprises a description of an aspect of a software application, N being at least 2, M being at least 2, said method comprising executing a documentation synchronization agent, wherein said executing comprises updating N1 database instances of the N database instances with the M application documentations and not updating the remaining N-N1 database instances that remains if N1 is less than N, wherein N1 is at least 1, wherein if N1 is less than N then each of the remaining N-N1 database instances comprise at least one characteristic of a first characteristic and a second characteristic, wherein the first characteristic is that the remaining database instances comprise the M application documentations upon initiation of said executing, and wherein the second characteristic is that the documentation synchronization agent is unable to access the remaining N-N1 database instances during said executing.

12. The computer system of claim 11, wherein N2 database instances of the N1 database instances comprises the M application documentations upon initiation of said executing, and wherein N2 is at least 1.

13. The computer system of claim 11, wherein N1 is equal to N.

14. The computer system of claim 11, wherein N1 is less than N.

15. The computer system of claim 14, wherein at least one database instance of the remaining N-N1 database instances comprises the first characteristic.

16. The computer system of claim 14, wherein at least one database instance of the remaining N-N1 database instances comprises the second characteristic.

17. The computer system of claim 14, wherein at least one database instance of the remaining N-N1 database instances comprises the first characteristic and the second characteristic.

18. The computer system of claim 11, wherein the M application documentations are distributed among a plurality of databases.

19. The computer system of claim 11, wherein the M application documentations are all contained within a documentation synchronizing manager such that the documentation synchronizing manager is a single data structure.

20. The computer system of claim 19, wherein the documentation synchronizing manager comprises the documentation synchronization agent.

21. A computer program product, comprising a computer usable medium having a computer readable program code embodied therein, said computer readable program code adapted to implement a method for synchronizing M application documentations across N database instances, wherein each application documentation comprises a description of an aspect of a software application, N being at least 2, M being at least 2, said method comprising executing a documentation synchronization agent, wherein said executing comprises updating N1 database instances of the N database instances with the M application documentations and not updating the remaining N-N1 database instances that remains if N1 is less than N, wherein N1 is at least 1, wherein if N1 is less than N then each of the remaining N-N1 database instances comprise at least one characteristic of a first characteristic and a second characteristic, wherein the first characteristic is that the remaining database instances comprise the M application documentations upon initiation of said executing, and wherein the second characteristic is that the documentation synchronization agent is unable to access the remaining N-N1 database instances during said executing.

22. The computer program product of claim 21, wherein N2 database instances of the N1 database instances comprises the M application documentations upon initiation of said executing, and wherein N2 is at least 1.

23. The computer program product of claim 21, wherein N1 is equal to N.

24. The computer program product of claim 21, wherein N1 is less than N.

25. The computer program product of claim 24, wherein at least one database instance of the remaining N-N1 database instances comprises the first characteristic.

26. The computer program product of claim 24, wherein at least one database instance of the remaining N-N1 database instances comprises the second characteristic.

27. The computer program product of claim 24, wherein at least one database instance of the remaining N-N1 database instances comprises the first characteristic and the second characteristic.

28. The computer program product of claim 21, wherein the M application documentations are distributed among a plurality of databases.

29. The computer program product of claim 21, wherein the M application documentations are all contained within a documentation synchronizing manager such that the documentation synchronizing manager is a single data structure.

30. The computer program product of claim 29, wherein the documentation synchronizing manager comprises the documentation synchronization agent.

* * * * *